(12) United States Patent
Yang et al.

(10) Patent No.: US 8,890,822 B2
(45) Date of Patent: Nov. 18, 2014

(54) METHOD FOR CONTROLLING OPERATIONS OF A TOUCH PANEL

(75) Inventors: Chun-Wei Yang, Hsin-Chu (TW);
Jing-Jhih Huang, Hsin-Chu (TW);
Yu-Min Hsu, Hsin-Chu (TW);
Yung-Tse Cheng, Hsin-Chu (TW)

(73) Assignee: AU Optronics Corp., Science-Based Industrial Park, Hsin Chu (TW)

( * ) Notice: Subject to any disclaimer, the term of this patent is extended or adjusted under 35 U.S.C. 154(b) by 103 days.

(21) Appl. No.: 13/326,293

(22) Filed: Dec. 14, 2011

(65) Prior Publication Data
US 2012/0319962 A1 Dec. 20, 2012

(30) Foreign Application Priority Data

Dec. 14, 2010 (TW) .................. 99143676 A
Dec. 14, 2011 (TW) .................. 100146157 A

(51) Int. Cl.
| | | |
|---|---|---|
| G09G 3/30 | (2006.01) | |
| G09G 5/00 | (2006.01) | |
| G06F 3/044 | (2006.01) | |
| G06F 3/041 | (2006.01) | |
| G06F 3/045 | (2006.01) | |

(52) U.S. Cl.
CPC .............. *G06F 3/0418* (2013.01); *G06F 3/044* (2013.01); *G06F 3/045* (2013.01)
USPC .............................. 345/173; 345/78; 345/204

(58) Field of Classification Search
USPC ............ 345/156–178, 204; 178/18.01–18.09, 178/20.01–20.04
See application file for complete search history.

(56) References Cited

U.S. PATENT DOCUMENTS

| | | | | |
|---|---|---|---|---|
| 5,825,345 | A * | 10/1998 | Takahama et al. ............ | 345/104 |
| 7,053,886 | B2 * | 5/2006 | Shin .............................. | 345/173 |
| 2011/0157064 | A1 * | 6/2011 | Imai .............................. | 345/173 |
| 2012/0075197 | A1 * | 3/2012 | Nurmi .......................... | 345/173 |

FOREIGN PATENT DOCUMENTS

WO  WO/2010/024179  *  3/2010 ............. G02F 1/133

* cited by examiner

*Primary Examiner* — Kent Chang
*Assistant Examiner* — Nelson Rosario
(74) *Attorney, Agent, or Firm* — Winston Hsu; Scott Margo

(57) ABSTRACT

A method for controlling operations of a touch panel includes synchronizing timing of a plurality of gate lines and timing of a plurality of touch sensors; determining whether polarities of common voltages of a display layer are consistent when driving signals are outputted to a first gate line and a second gate line, the second gate line following the first gate line; and if the polarities are consistent, outputting at least one driving pulse to a touch sensor of the plurality of touch sensors after image data corresponding to the second gate line is transmitted to the display layer.

14 Claims, 6 Drawing Sheets

| | | | | | | | |
|---|---|---|---|---|---|---|---|
| G1 | + | − | + | − | + | − | ..... |
| | + | | | | | | |
| | − | | | | | | |
| | − | | | | | | |
| Gn | + | | | | | | |
| Gn+1 | + | | | | | | |
| | ⋮ | | | | | | |
| Gm | + | | | | | | |
| Gm+1 | − | | | | | | |
| | ⋮ | | | | | | |

FIG. 3

METHOD FOR CONTROLLING OPERATIONS OF A TOUCH PANEL

BACKGROUND OF THE INVENTION

1. Field of the Invention

The present invention is related to a method for controlling operations of a touch panel, and particularly to a method for controlling operations of a touch panel that can reduce touch sensing noise of the touch panel.

2. Description of the Prior Art

Please refer to FIG. 1. FIG. 1 is a diagram illustrating timing of driving signals YCLKs, a data coupling area, and a driving pulse according to the prior art. As shown in FIG. 1, a time interval T1 between two adjacent driving signals YCLKs is greater than a time interval T2 of the data coupling area, and the time interval T2 is greater than a time interval T3 of the driving pulse. During the time interval T2 of the data coupling area, a common voltage of a display panel (below the touch panel) is not constant, so a driving pulse is not transmitted to a touch sensor of the touch panel for detecting whether an object touches the touch panel. In a 60 Hz frame rate touch panel, a time interval T3 of a driving pulse is completely free from influence of a time interval T2 of a data coupling area. But, a time interval T1 between two adjacent driving signals YCLKs of a half source driver touch panel is shorter than a time interval T1 of the 60 Hz frame rate touch panel. Therefore, in the half source driver touch panel, a time interval T3 of a driving pulse can not avoid influence from a time interval T2 of a data coupling area, resulting in inability to determine whether an object touches the half source driver touch panel according to a detection result of the driving pulse.

SUMMARY OF THE INVENTION

An embodiment provides a method for controlling operations of a touch panel, where the touch panel includes a display layer and a sensing layer, a plurality of gate lines are formed on the display layer, and a plurality of touch sensors are formed on the sensing layer. The method includes synchronizing timing of the plurality of gate lines and timing of the plurality of touch sensors; determining whether polarities of common voltages of the display layer are consistent when driving signals are outputted to a first gate line and a second gate line, the second gate line following the first gate line; and if the polarities are consistent, outputting at least one driving pulse to a touch sensor of the plurality of touch sensors after image data corresponding to the second gate line is transmitted to the display layer.

Another embodiment provides a method for controlling operations of a touch panel, where the touch panel includes a display layer and a sensing layer, a plurality of gate lines are formed on the display layer, and a plurality of touch sensors are formed on the sensing layer. The method includes synchronizing timing of the plurality of gate lines and timing of the plurality of touch sensors; and determining whether polarities of common voltages of the display layer are consistent when driving signals are outputted to a first gate line and a second gate line, the second gate line following the first gate line; wherein if the polarities of the common voltages of the display layer are inconsistent when the driving signals are outputted to the first gate line and the second gate line, no driving pulse is outputted to the plurality of touch sensors after image data corresponding to the second gate line is transmitted to the display layer.

The present invention provides a method for controlling operations of a touch panel. The method first determines whether a time interval between two driving signals of two adjacent gates is a data coupling area of the touch panel, then outputs at least one driving pulse to a touch sensor corresponding to the two adjacent gates in a non-data coupling area. Thus, the present invention can reduce influence of common voltages of the touch panel and further increase accuracy of touch detection of the touch panel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating determining a time interval between two driving signals of two adjacent gate lines is a data coupling area of the touch panel, and a time interval between two driving signals of another two adjacent gate lines is not a data coupling area.

DETAILED DESCRIPTION

Figure 1:
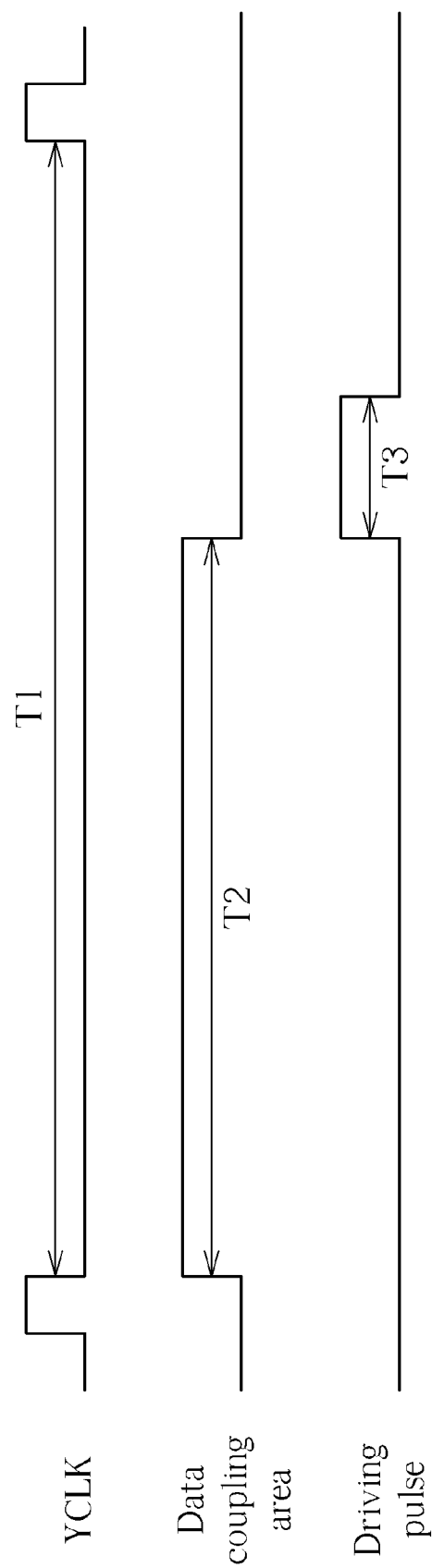
FIG. 1 is a diagram illustrating timing of driving signals, a data coupling area, and a driving pulse according to the prior art.
Figure 2:
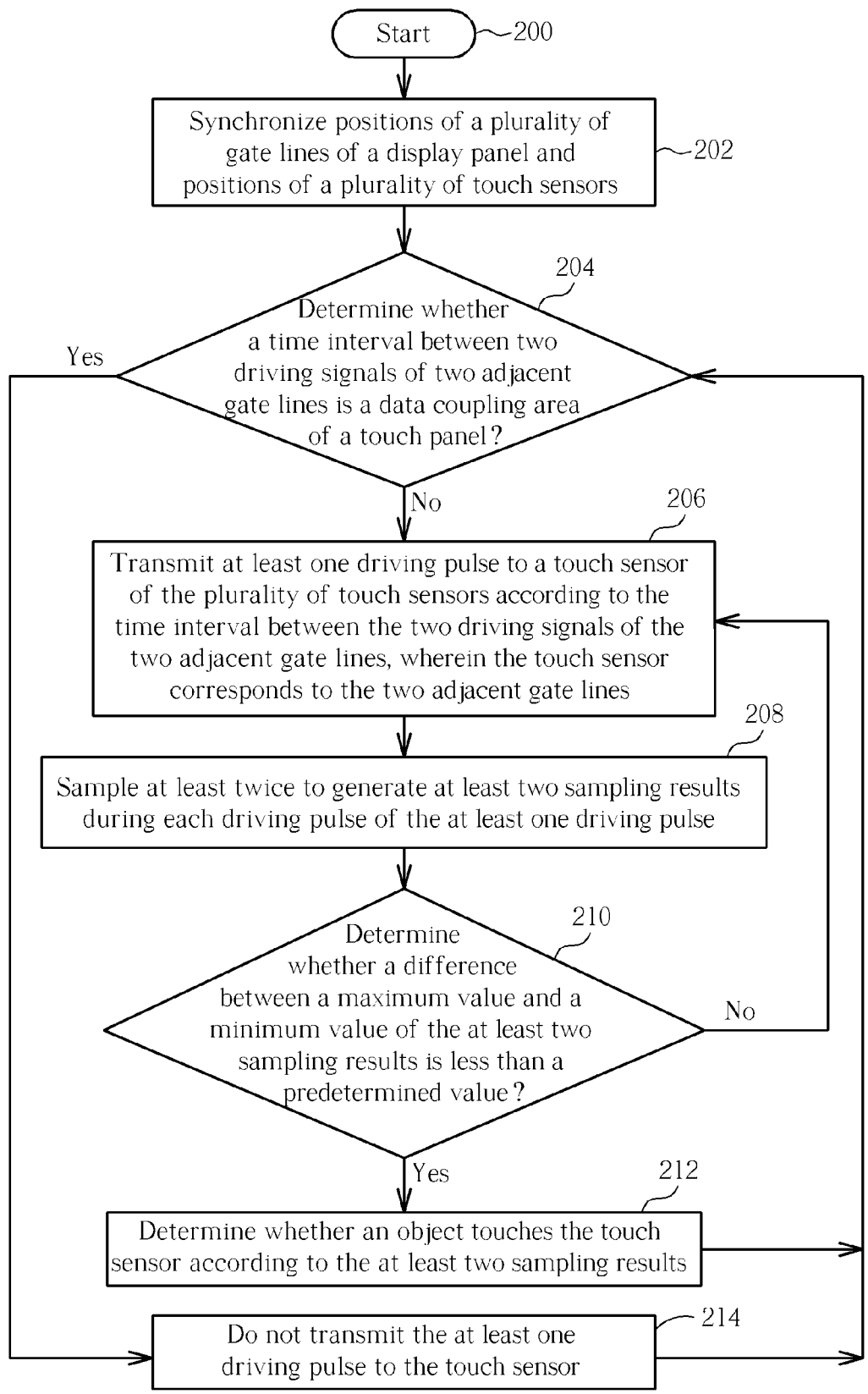
FIG. 2 is a flowchart illustrating a method for controlling operations of a touch panel according to an embodiment.

Please refer to FIG. 2. FIG. 2 is a flowchart illustrating a method for controlling operations of a touch panel according to an embodiment, where the touch panel includes a display layer and a sensing layer, a plurality of gate lines are formed on the display layer, a plurality of touch sensors are formed on the sensing layer, and the touch panel is a half source driver touch panel. Detailed steps are as follows:

Step 200: Start.

Step 202: Synchronize timing of the plurality of gate lines with timing of the plurality of touch sensors.

Step 204: Determine whether polarities of common voltages of the display layer are consistent when driving signals are outputted to a first gate line and a second gate line? If yes, go to Step 206; if no, go to Step 216.

Step 206: Output at least one driving pulse to a touch sensor of the plurality of touch sensors after image data corresponding to the second gate line is transmitted to the display layer.

Step 208: Sample voltages detected by the touch sensor at least twice.

Step 210: Determine whether if noise of the voltages detected by the touch sensor is within a threshold? If yes, go to Step 212; if no, go to Step 214.

Step 212: Select a greatest voltage of the voltages sampled by the touch sensor; go to Step 204.

Step 214: Output another driving pulse to the touch sensor after a following consistency of polarities of driving signals of two gate lines is acknowledged; go to Step 208.

Step 216: No driving pulse is outputted to the plurality of touch sensors after image data corresponding to the second gate line is transmitted to the display layer; go to Step 204.

Detailed steps are as follows:

In Step 202, timing of driving signals of the plurality of gate lines is synchronized with timing of driving pulses of the plurality of touch sensors. Please refer to FIG. 3 before Step 204 is illustrated. FIG. 3 is a diagram illustrating determining a time interval between two driving signals of two adjacent gate lines Gn, Gn+1 is a data coupling area of the touch panel, and a time interval between two driving signals of two adjacent gate lines Gm, Gm+1 is not a data coupling area, where n, m are positive integers. As shown in FIG. 3, because polarities corresponding to the two adjacent gate lines Gn, Gn+1 are the same, the time interval between the two driving signals of the two adjacent gate lines Gn, Gn+1 is a data coupling area; because polarities corresponding to the two adjacent gate lines Gm, Gm+1 are the same, the time interval between the two driving signals of the two adjacent gate lines Gm, Gm+1 is not a data coupling area. It is noticed that when polarities corresponding to two adjacent gate lines are the same, voltage levels of the common voltages of the display layer are substantially the same, so polarities of common voltages of the display layer are consistent. Therefore, in Step 204, it is determined whether the polarities of the common voltages of the display layer are consistent when driving signals are outputted to the first gate line and the second gate line according to polarities corresponding to the first gate line and the second gate line, where the second gate line follows the first gate line.

Figure 4:
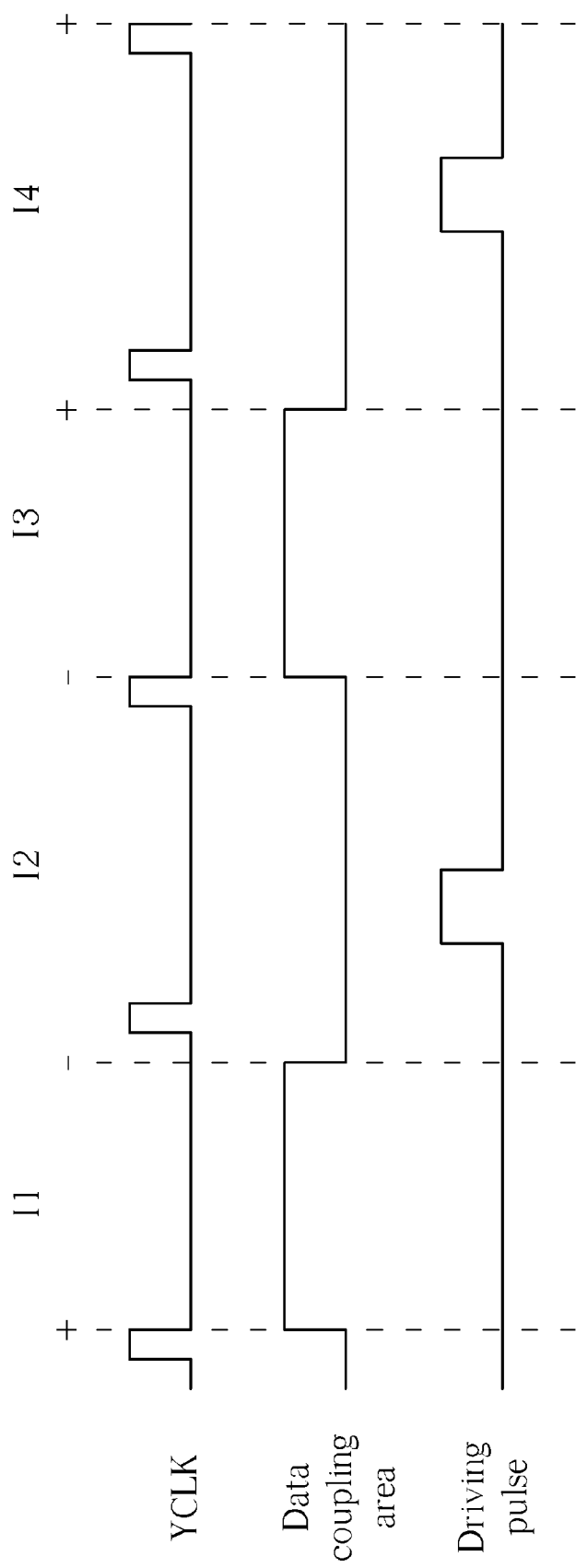
FIG. 4 is a diagram illustrating timing of driving signals of gate lines of the display layer, data coupling areas, and driving pulses.

Please refer to FIG. 4 before Step 206 is illustrated. FIG. 4 is a diagram illustrating timing of driving signals YCLKs of gate lines of the display layer, data coupling areas, and driving pulses. As shown in FIG. 4, a first interval I1 (the polarity of the common voltage of the display layer is changed from positive polarity (+) to negative polarity (−)) and a third interval I3 (the polarity of the common voltage of the display layer is changed from the negative polarity (−) to the positive polarity (+)) are data coupling areas (as described in FIG. 3), so no driving pulse is outputted to a touch sensor of the plurality of touch sensors; a second interval I2 (the polarity of the common voltage of the display layer is maintained at the negative polarity (−)) and a fourth interval I4 (the polarity of the common voltage of the display layer is maintained at the positive polarity (+)) are not data coupling areas, so at least one driving pulse is outputted to a touch sensor of the plurality of touch sensors. Therefore, in Step 206, when a time interval between two driving signals of two adjacent gate lines (the first gate line and the second gate line) is not a data coupling area of the touch panel, at least one driving pulse is outputted to a touch sensor of the plurality of touch sensors after image data corresponding to the second gate line is transmitted to the display layer, where number of driving pulses to output to a touch sensor corresponding to the two adjacent gate lines (the first gate line and the second gate line) is determined according to length of the time interval between the two driving signals of the two adjacent gate lines.

Figure 5A:
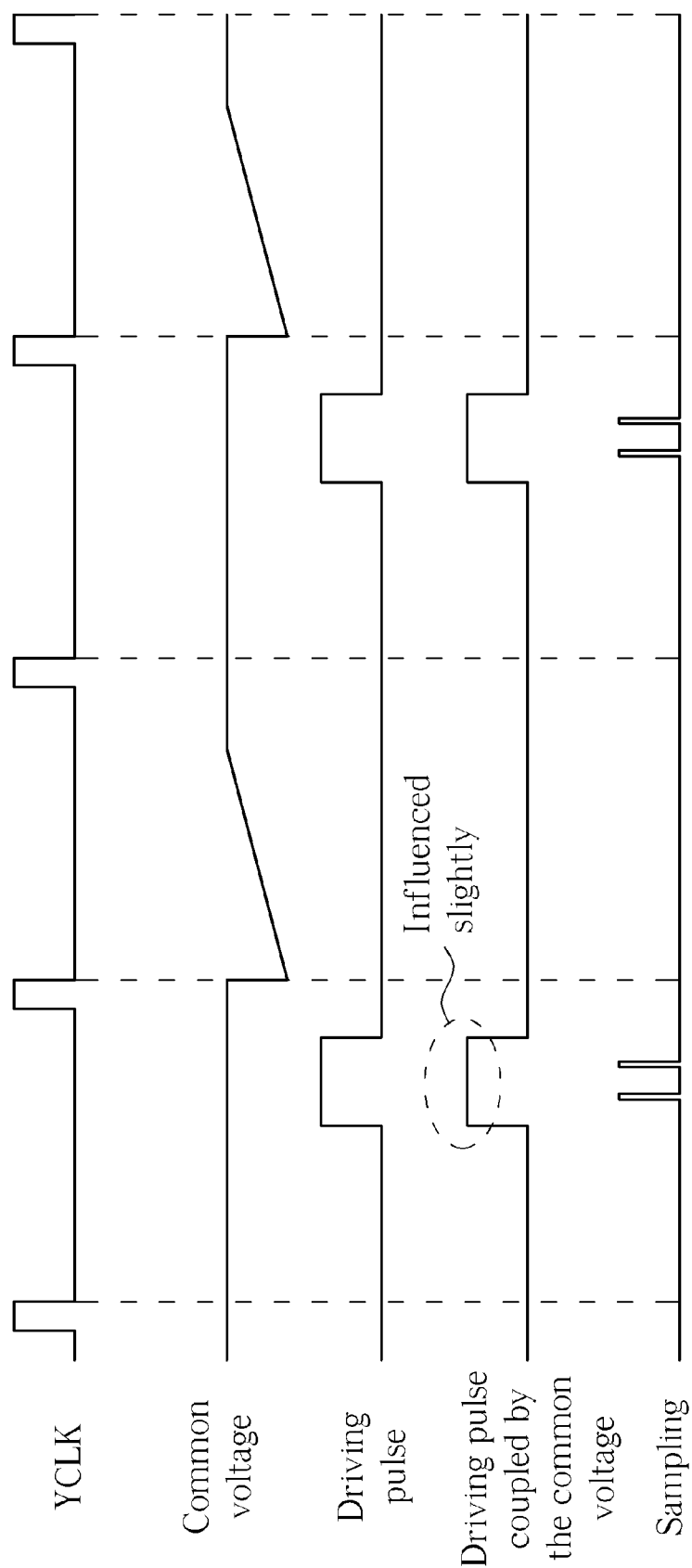
FIG. 5A is a diagram illustrating a driving pulse being influenced slightly by a common voltage of the display layer.
Figure 5B:
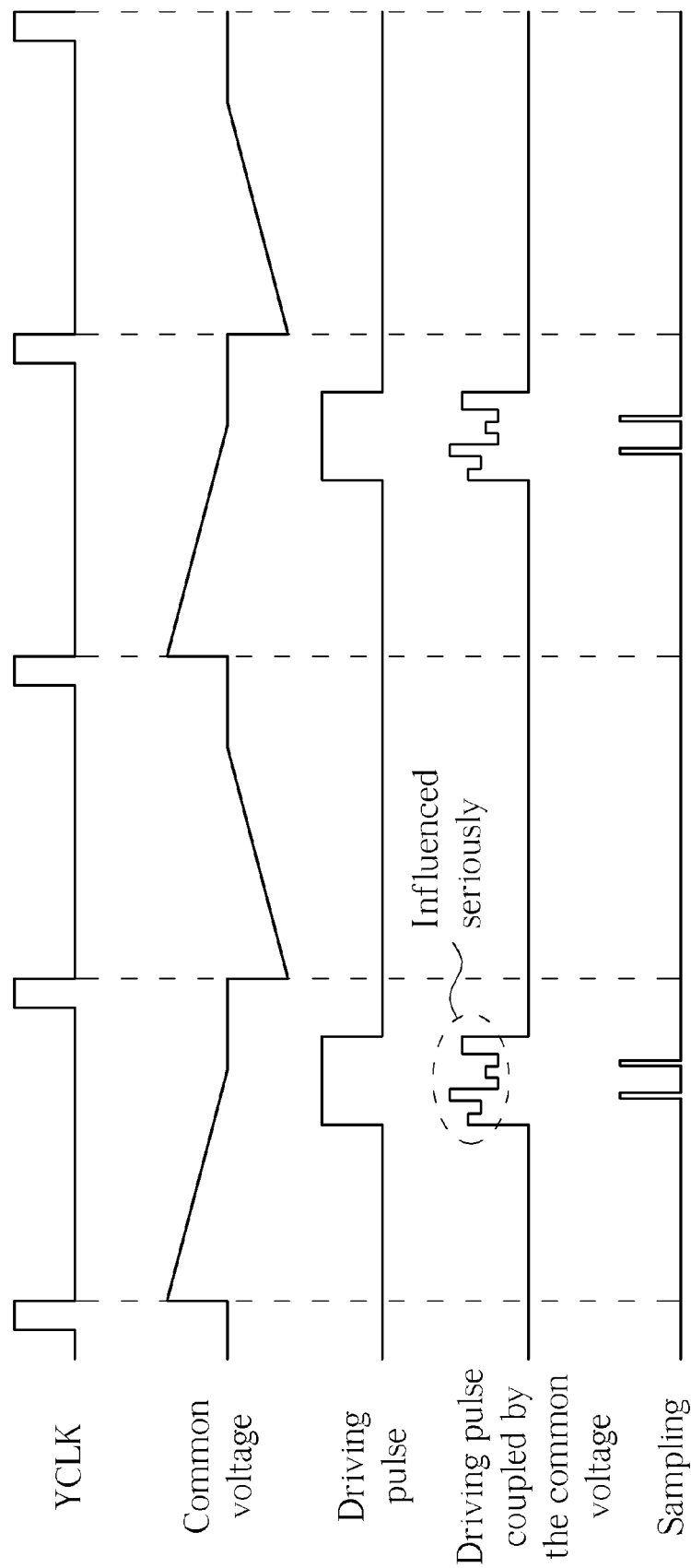
FIG. 5B is a diagram illustrating a driving pulse being influenced seriously by a common voltage of the display layer.

In Step 208, sampling voltages detected by the touch sensor is performed at least twice to generate at least two sampling results. Please refer to FIG. 5A and FIG. 5B. FIG. 5A is a diagram illustrating a driving pulse being influenced slightly by a common voltage of the display layer, and FIG. 5B is a diagram illustrating a driving pulse being influenced seriously by a common voltage of the display layer. In Step 212, as shown in FIG. 5A, when the at least two sampling results are within the threshold, the driving pulse is influenced slightly by the common voltage of the display layer, so the greatest voltage of the voltages sampled by the touch sensor is selected. Then, Step 204 is performed repeatedly, to determine continuously whether polarities of common voltages of the display layer are consistent when driving signals are outputted to next two gate lines after the first gate line and the second gate line. In Step 214, as shown in FIG. 5B, when the at least two sampling results are greater than the threshold, the driving pulse is influenced seriously by the common voltage of the display layer, which reduces the accuracy of touch detection of the touch panel, so the sampling result is neglected and another driving pulse is outputted to the touch sensor after a following consistency of polarities of driving signals of two gate lines after the first gate line and the second gate line is acknowledged. Then, Step 208 is repeated. In addition, the present invention is not limited to the number of sampling operations shown in FIG. 5A and FIG. 5B.

In Step 216, because the polarities of the common voltages of the display layer are inconsistent when driving signals are outputted to the first gate line and the second gate line (that is, a time interval between two driving signals of the first gate line and the second gate line is a data coupling area), no driving pulse is outputted to the plurality of touch sensors after image data corresponding to the second gate line is transmitted to the display layer. Then Step 204 is performed repeatedly, to determine continuously whether polarities of common voltages of the display layer are consistent when driving signals are outputted to two following adjacent gates after the first gate line and the second gate line.

To sum up, the method for controlling operations of a touch panel first determines whether a time interval between two driving signals of two adjacent gates is a data coupling area of the touch panel, then outputs at least one driving pulse to a touch sensor corresponding to the two adjacent gates in a non-data coupling area. Thus, the present invention can reduce influence of the common voltages of the touch panel and further increase the accuracy of the touch detection of the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling operations of a touch panel, the touch panel comprising a display layer and a sensing layer, a plurality of gate lines formed on the display layer, and a plurality of touch sensors formed on the sensing layer, the method comprising:
   synchronizing timing of the plurality of gate lines and timing of the plurality of touch sensors;
   determining whether polarities of common voltages of the display layer are consistent when driving signals are outputted to a first gate line and a second gate line, the second gate line following the first gate line;
   when the polarities are consistent, outputting at least one driving pulse to a touch sensor of the plurality of touch sensors after image data corresponding to the second gate line is transmitted to the display layer; and
   determining whether polarities of common voltages of the display layer are consistent when driving signals are outputted to the second gate line and a third gate line, the third gate line following the second gate line;
   wherein when the polarities of the common voltages of the display layer are inconsistent when the driving signals are outputted to the second gate line and the third gate line, no driving pulse is outputted to the plurality of touch sensors after image data corresponding to the third gate line is transmitted to the display layer.

2. The method of claim 1, further comprising sampling voltages detected by the touch sensor at least twice when outputting the driving pulse.

3. The method of claim 2, further comprising determining if noise of the voltages detected by the touch sensor is within a threshold.

4. The method of claim 3, further comprising when the noise of the voltages detected by the touch sensor is within the threshold, selecting a greatest voltage of the voltages sampled by the touch sensor.

5. The method of claim 4, further comprising outputting another driving pulse to a following touch sensor after a following consistency of polarities of driving signals of two gate lines is acknowledged.

6. The method of claim 1, wherein determining whether the polarities of the common voltages of the display layer are consistent when the driving signals are outputted to the first gate line and the second gate line is determining whether voltage levels of the common voltages of the display layer are substantially the same when the driving signals are outputted to the first gate line and the second gate line.

7. The method of claim 3, further comprising when the noise of the voltages detected by the touch sensor is not within the threshold, outputting another driving pulse to the touch sensor after a following consistency of polarities of driving signals of two gate lines is acknowledged.

8. A method for controlling operations of a touch panel, the touch panel comprising a display layer and a sensing layer, a plurality of gate lines formed on the display layer, and a plurality of touch sensors formed on the sensing layer, the method comprising:
    synchronizing timing of the plurality of gate lines and timing of the plurality of touch sensors;
    determining whether polarities of common voltages of the display layer are consistent when driving signals are outputted to a first gate line and a second gate line, the second gate line following the first gate line;
    when the polarities of the common voltages of the display layer are inconsistent when the driving signals are outputted to the first gate line and the second gate line, outputting no driving pulse to the plurality of touch sensors after image data corresponding to the second gate line is transmitted to the display layer;
    determining whether polarities of common voltages of the display layer are consistent when driving signals are outputted to the second gate line and a third gate line, the third gate line following the second gate line; and
    outputting at least one driving pulse to a touch sensor of the plurality of touch sensors when the polarities of the common voltages of the display layer are consistent after image data corresponding to the third gate line is transmitted to the display layer.

9. The method of claim 8, further comprising sampling voltages detected by the touch sensor at least twice when outputting the driving pulse.

10. The method of claim 9, further comprising determining if noise of the voltages detected by the touch sensor is within a threshold.

11. The method of claim 10, further comprising when the noise of the voltages detected by the touch sensor is within the threshold, selecting a greatest voltage of the voltages sampled by the touch sensor.

12. The method of claim 11, further comprising outputting another driving pulse to a following touch sensor after a following consistency of polarities of driving signals of two gate lines is acknowledged.

13. The method of claim 8, wherein determining whether the polarities of the common voltages of the display layer are consistent when the driving signals are outputted to the first gate line and the second gate line is determining whether voltage levels of the common voltages of the display layer are substantially the same when the driving signals are outputted to the first gate line and the second gate line.

14. The method of claim 10, further comprising when the noise of the voltages detected by the touch sensor is not within the threshold, outputting another driving pulse to the touch sensor after a following consistency of polarities of driving signals of two gate lines is acknowledged.

* * * * *